United States Patent Office 3,320,303
Patented May 16, 1967

3,320,303
PRODUCTION OF TEREPHTHALIC ACID ESTERS
Walter Schenk, Heidelberg, Hans Nienburg, Ludwigshafen (Rhine), and Oskar Dorschner, Bad Homburg vor der Hohe, Germany, assignors to Badische Anilin- & Soda-Fabrik Aktiengesellschaft, Ludwigshafen (Rhine), Germany
No Drawing. Filed Mar. 19, 1963, Ser. No. 266,208
Claims priority, application Germany, Mar. 23, 1962, B 66,488
7 Claims. (Cl. 260—475)

This invention relates to a process for the production of esters of therephthalic acid from a dialkali salt of terephthalic acid and an alkanol, alkanediol or 1,2-epoxide.

Various methods for the esterification of terephthalic acid are already known. For example the esterification has been carried out at atmospheric or superatmospheric pressure and in presence of acid catalysts, such as hydrochloric acid, sulfuric acid, phosphoric acid or p-toluenesulfonic acid.

Methods for esterifying terephthalic acid without any catalyst at atmospheric or superatmospheric pressure are also known. Conversion in this case is not completed so that subsequent esterification must be carried out if practically quantitative conversion is to be achieved.

It is an object of this invention to provide a process for the production of terephthalic acid esters according to which a monoalkali salt of terephthalic acid is prepared from an aqueous solution of a dialkali salt of terephthalic acid, such as is obtained for example in the thermal rearrangement of alkali salts of benzenecarboxylic acids other than terephthalic acid, by means of an acid which has higher acidity than terephthalic acid and/or a corresponding anhydride and/or acid salt of another benzenecarboxylic acid, the monoalkali salt is then reacted with an alkanol, alkanediol or 1,2-epoxide, and the reaction mixture is separated into the ester and the neutral salt of terephthalic acid.

It is another object of this invention to provide a new initial material for the production of terephthalic acid esters.

Finally it is an object of this invention to provide process according to which the dialkali terephthalate formed during the process is to return to the initial material and therefore the yield of esters of terephthalic acid is increased.

These objects are achieved by adding an acid with a higher acidity than terephthalic acid and/or the corresponding anhydride and/or an acid salt of another benzenecarboxylic acid to an aqueous solution of the neutral salt of terephthalic acid so that an acid salt of terephthalic acid is separated, heating the said acid of terephthalic acid with an alkanol, alkanediol or 1,2-epoxide, if desired in the presence of esterification catalysts, separating the reaction mixture into the ester of terephthalic acid and the neutral salt of terephthalic acid, and if desired adding the neutral salt to the initial material.

The preferred initial materials are the alkali and alkaline earth metal salts of terephthalic acid, such as disodium terephthalate, dipotassium terephthalate and calcium terephthalate. It is possible however to use other salts of terephthalic acid, for example cadmium terephthalate or diammonium terephthalate. It is immaterial by what method the terephthalic acid has been prepared. For example terephthalic acid obtained by oxidation of dialkylbenzenes may be used. It is however particularly advantageous to use a neutral alkali metal terephthalate which has been obtained by thermal rearrangement or disportionation of other benzenecarboxylic acids.

Suitable acids with a higher acidity than terephthalic acid are hydrochloric acid, sulfuric acid, phosphoric acid, carbonic acid or carbon dioxide, organic acids, such as formic acid, acetic acid, benzoic acid, anhydrides of acids, such as acetic formic anhydride, acetic anhydride or succinic anhydride. The process may be carried out particularly advantageously by reacting the neutral salts of terephthalic acid in aqueous medium, e.g. in 5 to 25 percent solutions, especially dipotassium terephthalate, with another benzenedicarboxylic acid or an anhydride thereof, such as phthalic acid or phthalic anhydride. In this way the dialkali salts, particularly the dipotassium salt, of phthalic acid are obtained and after they have been mixed with a catalyst and after the water of the reaction mixture has been evaporated they may be supplied to a thermal rearrangement process.

Esterification of the acid terephthalate may be carried out with monohydric primary aliphatic alcohols having one to eight carbon atoms, preferably one to four carbon atoms, such as methanol, ethanol, propanol or butanol, or with α,ω-alkanediols having two to ten, preferably two to six, carbon atoms, such as glykol, 1,3-propylene glykol, 1,4-butylene glykol, 1,6-hexanediol. 1,2-epoxides having 2 to 4 carbon atoms, such as ethylene oxide or propylene oxide, may also be used.

The process may be carried out for example as follows:
Dipotassium terephthalate is reacted with phthalic anhydride in aqueous medium in equimolar amounts at 40 to 150° C., according to the reaction equation:

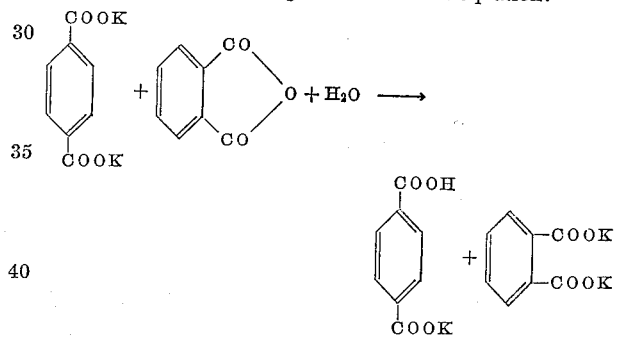

This reaction takes place quantitatively. The amount of benzenecarboxylic acid to be added may be controlled very simply by means of an automatic pH controller which is set to a range between 5.4 and 6.1, preferably between 5.5 and 5.8. After the very readily water-soluble dipotassium phthalate has been separated, e.g., by filtration or centrifuging from the practically water-insoluble potassium hydrogen terephthalate, there is carried out in a second stage in the presence of 2 to 20, preferably 3 to 10 moles of an alcohol per mole of monopotassium terephthalate, if desired with the addition of a conventional esterification catalyst, at temperatures between 80 and 350° C., preferably between 140 and 350° C., under the pressures thereby set up, and if desired with additional nitrogen pressured in, e.g., up to a total pressure of 300 atmospheres, the further reaction direct to dimethyl terephthalate with practically quantitative yield according to the reaction equation:

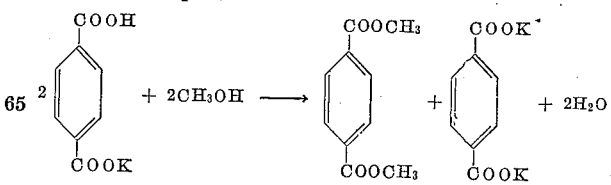

The reaction mixture may contain small amounts of water which as a rule are introduced by the residual moisture of the monoalkali terephthalate obtained in the first stage of the reaction and remaining from the centrifuging or filtration. The presence of the unreacted acid terephthalate, which undertakes the function of the acid catalyst such as sulfuric acid or sulfonic acid otherwise used for the esterification, has a particularly advantageous effect because the esterification may thus be carried out with good yields and at a high esterification rate without additional catalysts.

It is an advantage of this invention that the alkali portion of a salt of terephthalic acid is quantitatively converted into an alkali salt of a benzenecarboxylic acid other than terephthalic acid which can then be thermally rearranged to a salt of terephthalic acid, and at the same time the terephthalic acid is esterified.

It is a further advantage of this invention that especially the bisglycol ester of terephthalic acid is obtained in very good yields and in such a high degree of purity that it may be polycondensed direct.

By using an esterification catalyst, such as zinc borate, silica gel catalysts, aluminum oxide or cobalt sinter catalysts, the esterification reaction may be carried out at lower temperatures at sufficiently high reaction rates. The ester which remains after separation of the excess alcohol and the dipotassium terephthalate formed, may be distilled under subatmospheric pressure for further purification from traces of other contaminants. Bisglycol terephthalate may also be purified by recrystallization from hot water.

The process may be carried out either continuously or batchwise.

Terephthalic esters prepared in the way described are distinguished by a high degree of purity and may be used direct for further processing into polyethylene terephthalate. The fact that the terephthalic esters thus obtained can be processed into a satisfactory polyester without additional purification processes in spite of the simple and direct esterification is surprising because in all prior art methods the intermediate products have had to be subjected to numerous expensive purification methods before they could be processed into a spinnable polyester.

A further advantage of the process of this invention is that for the production of the alkali hydrogen terephthalate it is possible to use impure benzenecarboxylic acids, for example crude phthalic anhydride such as has been obtained direct in the production of the anhydride, or benzenecarboxylic acids which have been obtained by oxidation of alkylbenzenes and have not been purified.

If an organic benzenecarboxylic acid, such as phthalic acid, benzoic acid, isophthalic acid, or mixtures of benzenecarboxylic acids, such as are obtained for example by oxidation of crude xylene, is used for precipitation of the acid alkali terephthalate, the alkali cation is transferred to the benzenecarboxylic acid used for precipitation of the terephthalic acid. Working in this way offers considerable advantages when the alkali terephthalate is obtained from alkali salts of other benzenecarboxylic acids by way of conventional isomerization or disproportionation reactions, because it is then possible to return the alkali ion direct into the reaction cycle without waste. When precipitation is carried out with mineral acids or organic acids, such as p-toluenesulfonic acid, however, the alkali is obtained in the form of practically worthless sulfate, chloride, sulfochloride or the like, so that any recovery of the same for the process is possible only by the costly method of electrolysis of fused electrolytes.

The invention is further illustrated in the following examples in which parts are by weight.

Example 1

A mixture of 60.5 parts of dipotassium terephthalate, 18.7 parts of phthalic anhydride and 250 parts of water is heated for a short time at 95° C. while stirring and then cooled to 30° C. A pH value of 5.7 is thus set up in the reaction solution. The solid residue is filtered off and washed with 20 parts of cold water. The dry residue consists of 50.8 parts of potassium hydrogen terephthalate having an acid number of 274. 30.3 parts of dipotassium phthalate and a very small amount of potassium hydrogen phthalate remain dissolved in the filtrate.

The acid monopotassium terephthalate serves as the initial material for esterification. The filtrate is brought to a pH value of 8 by means of potassium carbonate, then 2% of cadmium carbonate is added and the whole evaporated to dryness. The solid material is then converted by thermal rearrangement into dipotassium terephthalate.

The 50.8 parts of potassium hydrogen terephthalate which still contains 3.5% of water is suspended in 180 parts of methanol in an agitated pressure vessel and heated to 320° C. for five hours while stirring. The whole is cooled to room temperatures and the excess methanol filtered off with suction from the precipitated solid which consists of dimethyl terephthalate and dipotassium terephthalate. The mixture of solids is then stirred with 100 parts of water while hot (60 to 90° C.), the dipotassium terephthalate passing completely into solution. After cooling the whole to 20 to 25° C., the water in soluble dimethyl terephthalates is separated from the dipotassium terephthalate solution (dry weight 30.4 parts) which may be used again as initial material for the recovery of potassium hydrogen terephthalate. The methanol filtrate, which contains 2.2 parts of water of esterification and 2 parts of dissolved dimethyl ester, may be used again for three to four further esterification batches prior to distillation and after replenishment of the amount of methanol used up. After drying, a total of 22.6 parts of crude dimethyl terephthalate having a pale color and a melting point of 139° C. is obtained (93.5% of the calculated amount) and this may for further purification be distilled from the melt at a pressure of 5 mm. Hg through a column, the dimethyl ester being removed overhead and the remaining traces of impurities at the bottom. Dimethyl terephthalate thus obtained is suitable for the production of polyethylene terephthalate without further purification.

Quantitative precipitation of the potassium hydrogen terephthalate can be carried out under the same reaction conditions with the equivalent amount of a mixture of benzenecarboxylic acids such as is obtained by oxidation of crude xylene having a composition of 53.3% of isophthalic acid, 13.3% of o-phthalic acid, 18.2% of terephthalic acid, and 15.2% of benzoic acid, provided that care is taken to ensure that the pH value set up by the precipitation is about 5.6 to 5.9. In this case, the terephthalic acid from the p-xylene component of the crude xylene and introduced together with the precipitation components, is also converted into acid monopotassium terephthalate and separated together with the potassium hydrogen terephthalate formed from the dipotassium terephthalate by precipitation.

Precipitation of monopotassium terephthalate from the water-soluble neutral dipotassium terephthalate may also be carried out with carbonic acid by the method described in U.S. patent specification No. 2,930,813. If it is desired to omit return of the alkali component into the reaction cycle of the phthalate isomerization, the precipitation of the monoalkali terephthalate may naturally also be carried out with a mineral acid, such as hydrochloric acid, sulfuric acid or an organic carboxylic acid, such as formic acid or acetic acid.

Example 2

48.5 parts of dipotassium terephthalate (obtained by thermal reaction of potassium benzoate at 445° C. and under carbon dioxide pressure in the presence of catalysts in the conventional way) is reacted with 24.45 parts of benzoic acid in 250 parts of water at 90° C. while stirring, a pH value of 5.75 thus being set up. After the whole has been cooled to 30° C., the precipitated potassium hydrogen terephthalate is centrifuged off from the water soluble potassium benzoate which after adding a catalyst and evaporation in conventional fashion is converted by thermal disproportionation into dipotassium terephthalate and benzene in the conventional way. After the filter residue has been washed and dried, 40.8 parts of monopotassium terephthalate is obtained.

This 40.8 parts of potassium hydrogen terephthalate is mixed with 200 parts of methanol in an agitated pressure vessel with an addition of 1.2 parts of zinc borate, heated to 310° C. and kept at this temperature for three hours while stirring. After depressuring, the reaction mixture is worked up in a column by passing in 35 parts of superheated methanol vapor. Dimethyl terephthalate and methanol escape overhead while dipotassium terephthalate and zinc borate remain as distillation residue. The distillate is cooled to +10° C. and the deposited dimethyl ester separated by means of a centrifuge and washed with cold methanol. After it has been dried, 18.5 parts of pure dimethyl terephthalate is obtained. The methanol filtrate, which may be used for further esterification batches, still contains about 0.2 part of dimethyl ester in dissolved form and this may be used for further esterification batches, still contains about 0.2 part of dimethyl ester in dissolved form and this may be recovered during dehydration of the methanol. To separate the catalyst component from the dipotassium terephthalate, the esterification residue is treated with 60 parts of hot water, 24.9 parts of dipotassium terephthalate thus passing into solution and being returned, after separation of the solid residue, for working up to monopotassium terephthalate. It is however also possible to return the esterification catalyst, without previous separation, together with the dipotassium terephthalate to be worked up to monopotassium terephthalate, and to use it again after simultaneous separation together with the monopotassium terephthalate in the esterification stage without previous processing.

Example 3

Phthalic anhydride is stirred into a solution of 121 parts of dipotassium terephthalate in 750 parts of water at 100° C. until the pH value of the mixture is 5.6 and then the deposited monopotassium terephthalate is filtered off with suction.

The filtrate, which contains dipotassium phthalate, may be used again for the production of dipotassium terephthalate by conventional methods.

The moist filter cake of monopotassium terephthalate is suspended in 280 parts of water. Ethylene oxide is passed into the suspension at 95° C. until the mixture has become almost clear. It is then filtered while hot; 0.8 part of monopotassium terephthalate is thus obtained and this can be added to the next batch. The clear filtrate is cooled to 0° C. and the bis-$\beta$-hydroxyethylterephthalate (called bis-glycol ester hereinafter) which crystallizes out is filtered off and dried. The yield is 33.5 parts, having the melting point 110° C.

The filtrate, which contains the whole of the potassium ions and the unreacted terephthalic acid in the form of their salts or ester salts, has added to it such an amount of dipotassium terephthalate as is equivalent to the bis-glycol ester obtained and is then heated and returned to the precipitation stage.

Example 4

Phthalic anhydride is stirred into a solution of 24.2 kg. of dipotassium phthalate in 150 kg. of water at 100° C. until the pH value of the mixture is 5.6. The deposited monopotassium terephthalate is separated and stirred with 50 kg. of water in an agitated pressure vessel. The vessel is closed and brought to 30 atmospheres gage with nitrogen. The mixture is passed continuously together with 1 kg. of ethylene oxide per hour through a tube of 10 mm. diameter and 12.35 m. length which is heated to 150° C. A valve is provided at the end of the tube and this is adjusted so that 12 liters per hour of the mixture is expanded to atmospheric pressure into a receiver having a reflux condenser. A temperature of 85 to 90° C. is set up in the receiver by evaporation of water and radiation. Small amounts of undissolved substance are filtered off at this temperature. The clarified solution is cooled to 0° C. and the bis-glycol ester which crystallizes out and which contains small amounts of monoglycol ester is separated.

10.3 kg. of the ester remains behind after drying. The filtrate, which contains 9.9 kg. of terephthalic acid in the form of its salts or ester salts, is returned to the process as described in Example 1.

We claim:
1. A process for the production of esters of terephthalic acid which comprises:
  converting in a first stage at a temperature of about 40° C. to 150° C. a neutral alkali metal salt of terephthalic acid into the acid alkali metal salt of terephthalic acid by means of an acid having a higher acidity than terephthalic acid and being selected from the group consisting of benzenecarboxylic acids and the corresponding anhydrides and acid alkali metal salts of said benzenecarboxylic acids in an amount sufficient to achieve a pH in said first stage of about 5.4 to 6.1;
  reacting said acid alkali metal salt of terephthalic acid in a second stage at a temperature of about 80° C. to 350° C. with a compound selected from the group consisting of alkanols of 1 to 4 carbon atoms, $\alpha,\omega$ alkanediols of 2 to 10 carbon atoms and 1,2-epoxides of 2 to 4 carbon atoms; and
  separating the resulting ester of terephthalic acid.

2. A process according to claim 1, wherein the initial neutral salt is dipotassium terephthalate.

3. A process according to claim 1 wherein the reaction in said second stage is carried out in the presence of an esterification catalyst selected from the group consisting of zinc borate, silica gel, aluminum oxide and sintered cobalt.

4. A process according to claim 1, wherein the first process stage is carried out so as to achieve a pH between 5.5 to 5.8.

5. A process as claimed in claim 1 wherein said second stage reaction is carried out at a temperature of 140° C. to 350° C. and under a total pressure of up to 300 atmospheres.

6. A process as claimed in claim 1 wherein said acid having a higher acidit than terephthalic acid is phthalic anhydride.

7. A process as claimed in claim 1 wherein said acid alkali metal salt of terephthalic acid is reacted in said second stage with methanol.

References Cited by the Examiner
UNITED STATES PATENTS
2,841,615  7/1958  Schutt et al. _____ 260—475

LORRAINE A. WEINBERGER, Primary Examiner.
THOMAS L. GALLOWAY, Assistant Examiner.

UNITED STATES PATENT OFFICE
CERTIFICATE OF CORRECTION

Patent No. 3,320,303            May 16, 1967

Walter Schenk et al.

It is hereby certified that error appears in the above numbered patent requiring correction and that the said Letters Patent should read as corrected below.

Column 1, line 14, for "therephthalic" read -- terephthalic --; line 53, for "acid of terephthalic" read -- acid salt of terephthalic --; line 70, for "disportionation" read -- disproportionation --; column 4, line 22, for "terephthalates" read -- terephthalate --; column 5, lines 22 to 24, strike out "used for further esterification batches, still contains about 0.2 part of dimethyl ester in dissolved form and this may be"; column 6, line 56, for "acidit" read -- acidity --.

Signed and sealed this 2nd day of January 1968.

(SEAL)
Attest:

Edward M. Fletcher, Jr.            EDWARD J. BRENNER

Attesting Officer            Commissioner of Patents